United States Patent
Beaty et al.

(10) Patent No.: US 10,525,558 B2
(45) Date of Patent: Jan. 7, 2020

(54) CHUCK BODY, MACHINE CENTER, AND METHOD FOR GRIPPING A WORK OBJECT TO BE PROCESSED

(71) Applicant: Honda Motor Co., Ltd., Tokyo (JP)

(72) Inventors: Eric L. Beaty, Troy, OH (US); Nicholas A. Jeffers, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 916 days.

(21) Appl. No.: 14/136,804

(22) Filed: Dec. 20, 2013

(65) Prior Publication Data

US 2014/0183805 A1 Jul. 3, 2014

Related U.S. Application Data

(60) Provisional application No. 61/746,701, filed on Dec. 28, 2012.

(51) Int. Cl.
*B23Q 3/08* (2006.01)

(52) U.S. Cl.
CPC ........... *B23Q 3/08* (2013.01); *Y10T 29/49998* (2015.01)

(58) Field of Classification Search
CPC ........... B25B 5/003; B25B 5/02; B25B 5/163; B25B 11/02; B25B 5/061; B25B 5/14; B25B 5/166; Y10S 269/90; Y10S 269/902; Y10S 269/909; B23Q 3/06; B23Q 3/02; B23Q 3/064; B23Q 3/00; B23Q 3/08; B23Q 3/062; B23Q 3/103; Y10T 29/49998

USPC ......... 269/25, 27, 28, 32, 35, 53, 54.2, 54.4, 269/54.5, 265, 269, 270, 156; 29/281.1
See application file for complete search history.

(56) References Cited

U.S. PATENT DOCUMENTS

| | | | | |
|---|---|---|---|---|
| 3,927,872 A | * | 12/1975 | Sessody | B25B 1/18 269/32 |
| 4,612,697 A | | 9/1986 | Palfery et al. | |
| 4,641,413 A | | 2/1987 | Hallqvist | |
| 4,666,060 A | | 5/1987 | Bouldin | |
| 4,892,344 A | | 1/1990 | Takada et al. | |

(Continued)

FOREIGN PATENT DOCUMENTS

| | | | | |
|---|---|---|---|---|
| DE | | 3446012 A1 * | 7/1985 | ............ B23Q 3/061 |
| DE | | 10027536 | 12/2001 | |

(Continued)

*Primary Examiner* — Orlando E Aviles
*Assistant Examiner* — Joel D Crandall
(74) *Attorney, Agent, or Firm* — Rankin, Hill & Clark LLP

(57) ABSTRACT

A chuck body includes a base, a fixed gripper finger, a cylinder mount, a slide, and a movable gripper finger. The base includes a planar member. The fixed gripper finger is fixedly provided on the planar member at a position spaced from a longitudinal end of the planar member. The cylinder mount is mounted on the planar member, and includes a cylinder and a linear actuator operably engaging the cylinder to linearly move the cylinder in a longitudinal direction of the planar member toward and away from the fixed gripper finger. The slide is secured to a distal end of the cylinder and is integrally movable with the cylinder. The movable gripper finger is secured to the slide and positioned to cooperate with the fixed gripper finger to grip an associated work object when moved toward the fixed gripper finger by the linear actuator.

16 Claims, 5 Drawing Sheets

(56) References Cited

U.S. PATENT DOCUMENTS

| | | | | |
|---|---|---|---|---|
| 5,283,938 | A | * | 2/1994 | Jones .................... B23D 31/003 29/412 |
| 5,350,163 | A | * | 9/1994 | Lichtenberg ............ B25B 5/102 269/156 |
| 5,556,085 | A | * | 9/1996 | Cyr .......................... B25B 1/22 269/156 |
| 5,699,947 | A | * | 12/1997 | Cavallo ................ B23D 31/003 225/101 |
| 5,941,515 | A | * | 8/1999 | Salow ..................... B25B 5/003 269/156 |
| 5,944,326 | A | | 8/1999 | Ishibashi et al. |
| 6,293,742 | B1 | | 9/2001 | Miyagi et al. |
| 6,536,642 | B1 | * | 3/2003 | Cavallo ................ B23D 31/003 225/101 |
| 7,198,440 | B2 | | 4/2007 | Gnadt |
| 8,006,878 | B2 | * | 8/2011 | Okumura ............. B23D 31/003 225/103 |
| 2009/0250859 | A1 | * | 10/2009 | Okumura ............. B23D 31/003 269/74 |

FOREIGN PATENT DOCUMENTS

| | | | | |
|---|---|---|---|---|
| EP | 0467198 | A1 | * | 1/1992 ........... B23D 31/003 |
| JP | 2008221438 | A | * | 9/2008 |

* cited by examiner

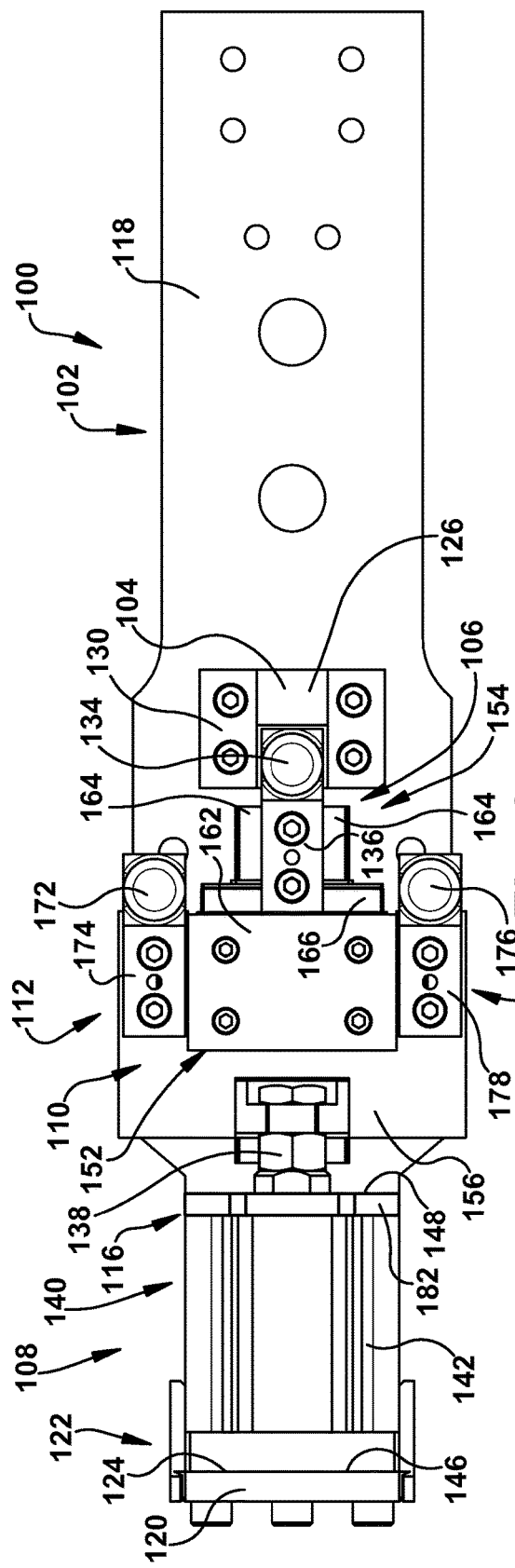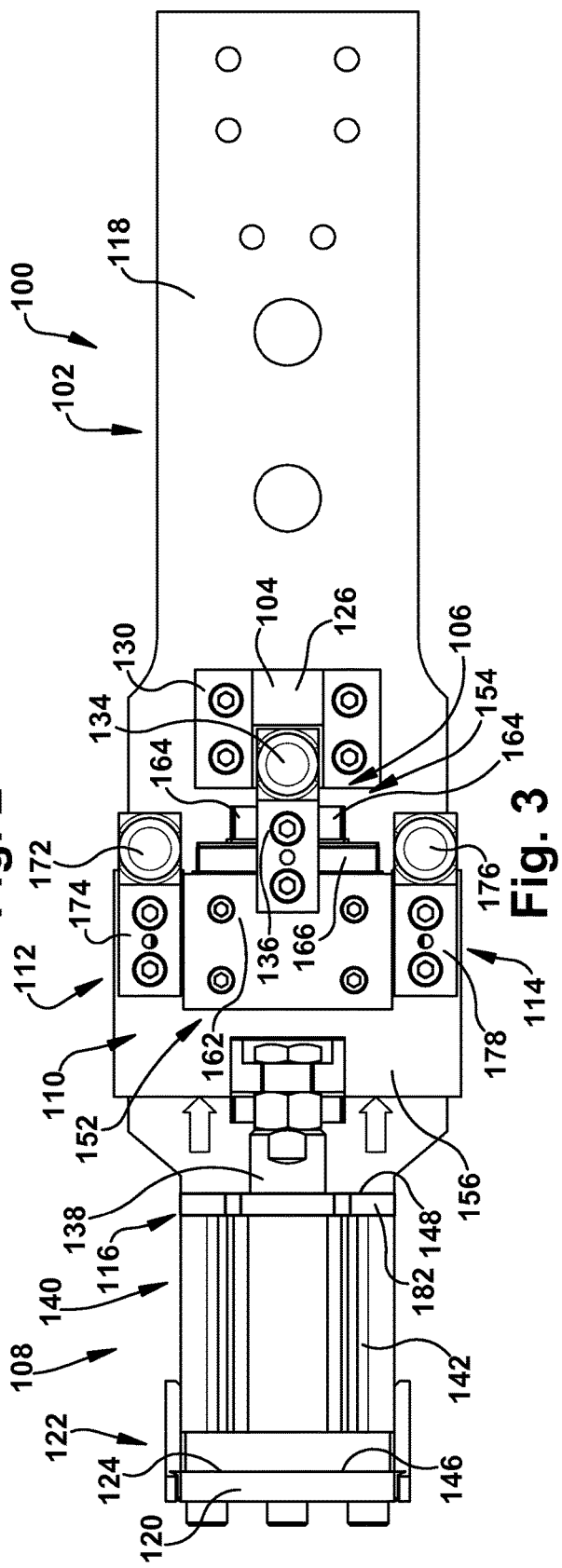

CHUCK BODY, MACHINE CENTER, AND METHOD FOR GRIPPING A WORK OBJECT TO BE PROCESSED

This application claims the benefit of U.S. provisional patent application Ser. No. 61/746,701, filed Dec. 28, 2012, which is incorporated by reference in its entirety herein.

BACKGROUND

Chuck bodies may be provided in machine centers, such as Computer Numerical Control (CNC) machines, to grip work objects as the objects are processed and/or measured. Chuck bodies may be formed of a relatively large number of parts, and typically include several moving parts, such as springs and cams. Due to the relatively large number of parts and several moving parts, maintenance of the chuck bodies may be cumbersome and time consuming. Specifically, a significant rebuild time may be required during maintenance of the chuck bodies. Furthermore, the frequency of needed maintenance increases as the number of parts, especially the number of moving parts, increases. Accordingly, chuck bodies having a relatively large number of parts and several moving parts may require frequent maintenance.

SUMMARY

According to one aspect, a chuck body includes a base, at least one fixed gripper finger, a cylinder mount, a slide, and at least one movable gripper finger. The base includes a planar member. The at least one fixed gripper finger is fixedly provided on the planar member at a position spaced from a longitudinal end of the planar member. The cylinder mount is mounted on the planar member, and includes a cylinder and a linear actuator operably engaging the cylinder to linearly move the cylinder in a longitudinal direction of the planar member toward and away from the at least one fixed gripper finger. The slide is secured to a distal end of the cylinder and is integrally movable with the cylinder. The at least one movable gripper finger is secured to the slide and positioned to cooperate with the at least one fixed gripper finger to grip an associated work object when the cylinder and slide are moved toward the at least one fixed gripper finger by the linear actuator.

According to another aspect, a machine center includes a machine center body, a chuck body mounted on the machine center body and configured to grip an associated work object, a work object communicator including a gripper for gripping the associated work object and a mover for moving the associated work object from a first position to a second position at which the chuck body can grip the associated work object; and a tool movably secured to the machine center body and configured to process the associated work object gripped by the chuck body. The chuck body includes a base, at least one fixed gripper finger, a cylinder mount, a slide, and at least one movable gripper finger. The base includes a planar member. The at least one fixed gripper finger is fixedly provided on the planar member at a position spaced from a longitudinal end of the planar member. The cylinder mount is mounted on the planar member, and includes a cylinder and a linear actuator operably engaging the cylinder to linearly move the cylinder in a longitudinal direction of the planar member toward and away from the at least one fixed gripper finger. The slide is secured to a distal end of the cylinder and is integrally movable with the cylinder. The at least one movable gripper finger is secured to the slide and positioned to cooperate with the at least one fixed gripper finger to grip an associated work object when the cylinder and slide are moved toward the at least one fixed gripper finger by the linear actuator.

According to another aspect, a method for gripping a work object to be processed includes providing a chuck body. The chuck body includes a base, at least one fixed gripper finger, a cylinder mount, a slide, and at least one movable gripper finger. The base includes a planar member. The at least one fixed gripper finger is fixedly provided on the planar member at a position spaced from a longitudinal end of the planar member. The cylinder mount is mounted on the planar member, and includes a cylinder and a linear actuator operably engaging the cylinder to linearly move the cylinder in a longitudinal direction of the planar member toward and away from the at least one fixed gripper finger. The slide is secured to a distal end of the cylinder and is integrally movable with the cylinder. The at least one movable gripper finger is secured to the slide and positioned to cooperate with the at least one fixed gripper finger to grip an associated work object when the cylinder and slide are moved toward the at least one fixed gripper finger by the linear actuator. The method also includes placing the work object with a portion of the work object disposed between the at least one fixed gripper finger and the at least one movable gripper finger when the at least one fixed gripper finger and the at least one movable gripper finger are in an open position. The cylinder is then actuated using the linear actuator to move the slide and the at least one movable gripper finger toward the at least one fixed gripper finger such that the at least one fixed gripper finger and the at least one movable gripper finger press against said portion of the work object and thereby grip the work object.

BRIEF DESCRIPTION OF THE DRAWINGS

FIG. 2 is a plan view of the chuck body shown in FIG. 1 in an open position.

FIG. 3 is a plan view of the chuck body shown in FIG. 1 in a closed position.

DETAILED DESCRIPTION

Figure 1:
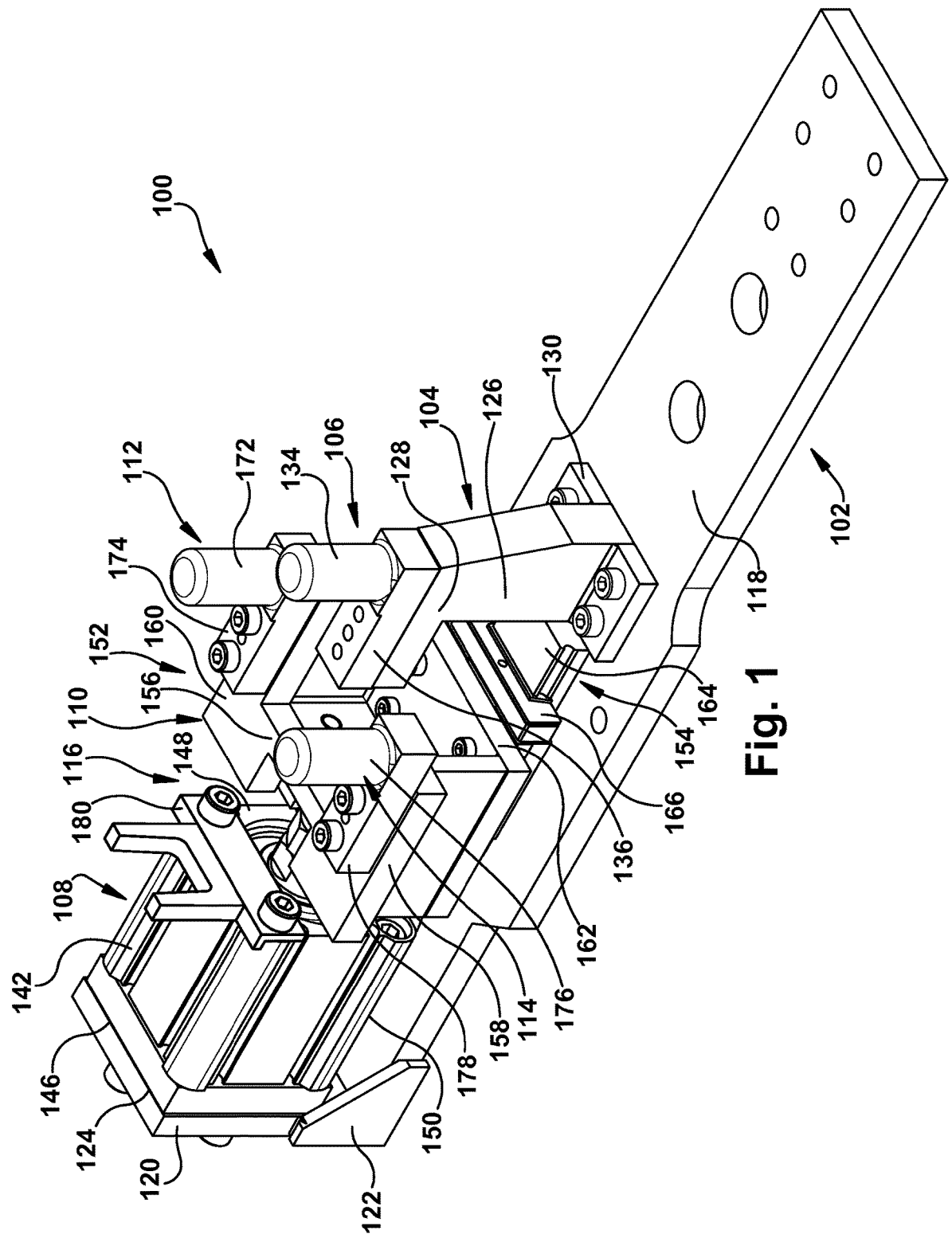
FIG. 1 is a perspective view of a chuck body as described herein.

The description and drawings herein are merely illustrative and various modifications and changes can be made in the structures disclosed without departing from what is defined in the appended claims. All references to direction and position, unless otherwise indicated, refer to the orientation of the structures and components illustrated in the drawings and should not be construed as limiting the claims appended hereto. Like numbers refer to like parts throughout the several views.

Figure 4:
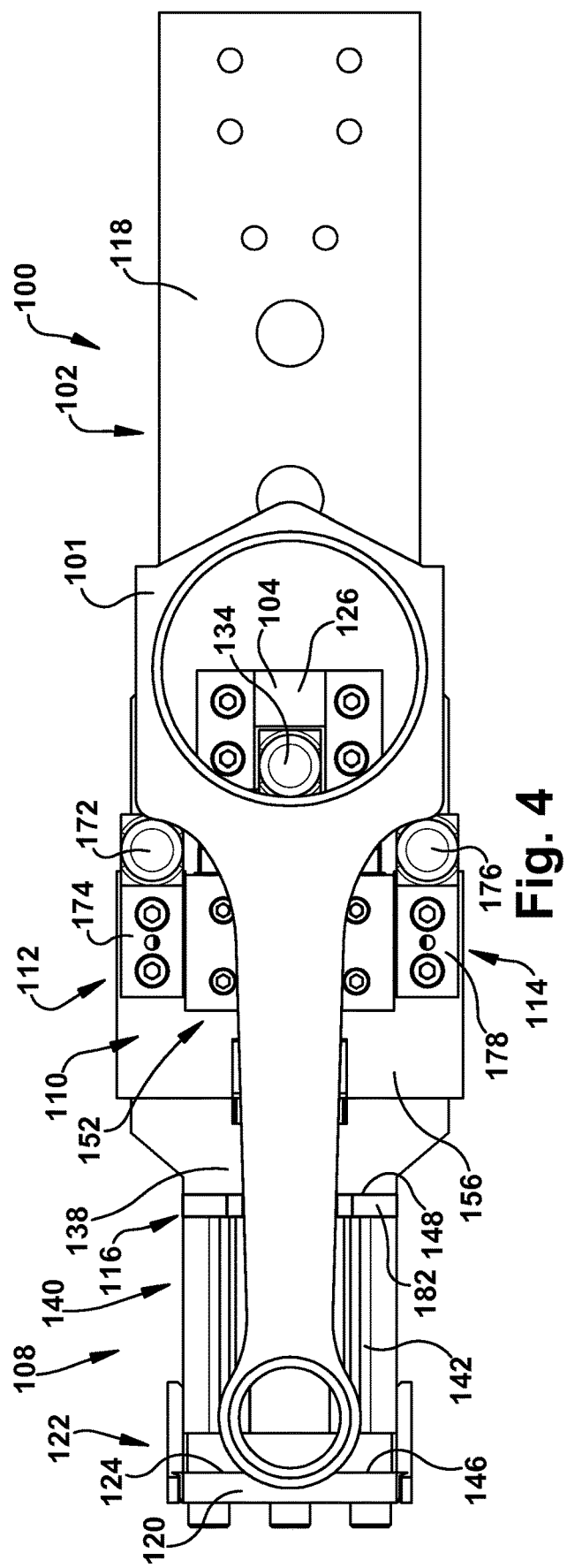
FIG. 4 is a plan view of the chuck body shown in FIG. 1 in the closed position while gripping an exemplary associated work object.
Figure 5:
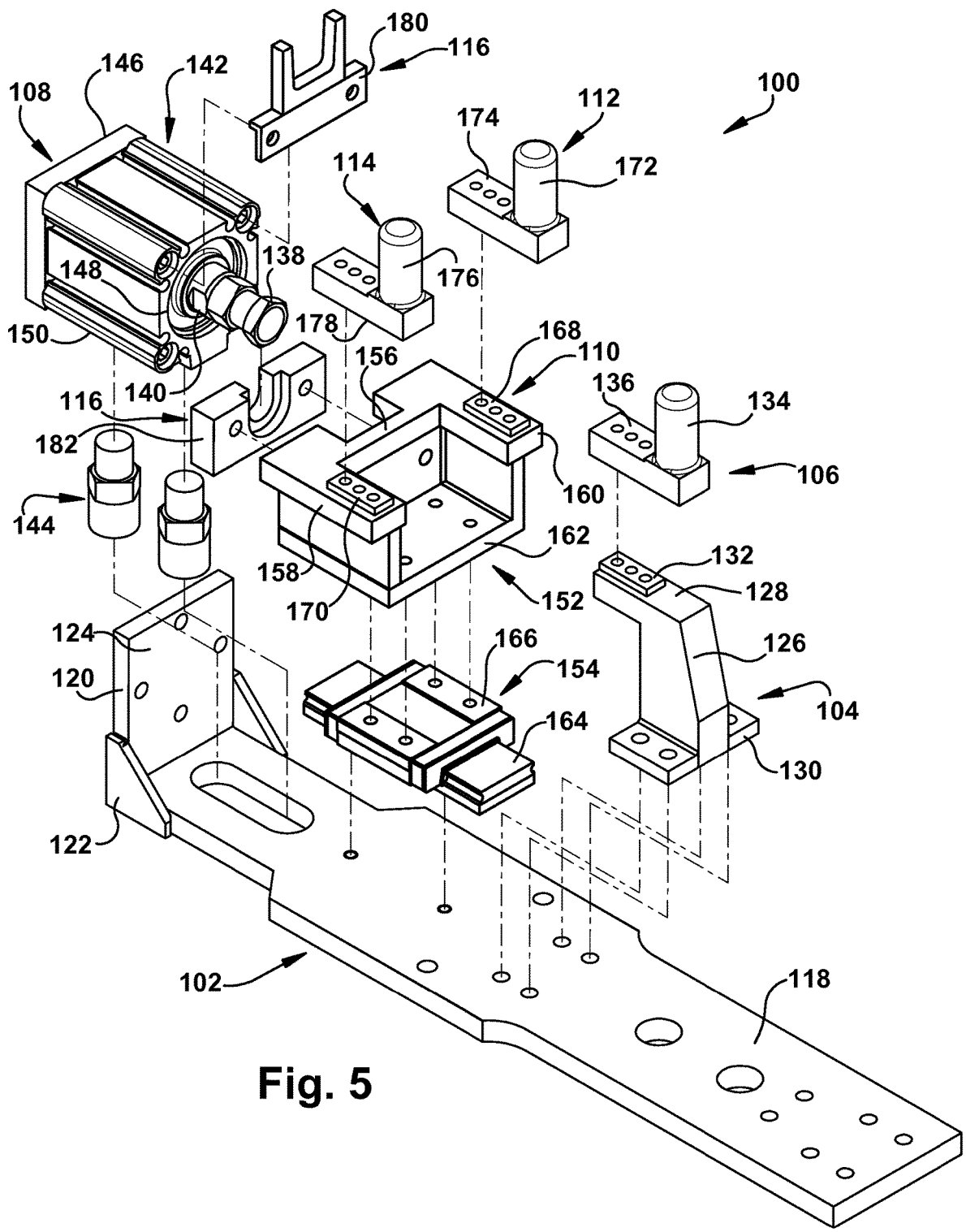
FIG. 5 is an exploded perspective view of the chuck body shown in FIG. 1.

FIGS. 1-5 illustrate a chuck body 100 which is used to grip an associated work object 101 (see FIG. 4). The chuck body 100 includes a base 102, a fixed gripper finger mount 104, a fixed gripper finger 106, a cylinder mount 108, a slide assembly 110, first and second movable gripper fingers 112, 114, and a work object support bracket 116. The fixed gripper finger mount 104, the fixed gripper finger 106, the cylinder mount 108, the slide assembly 110, the movable gripper fingers 112, 114, and the work object support bracket 116 are all provided on the base 102.

The base 102 includes a planar member 118 and a leg member 120 provided at a longitudinal end 122 of the planar member 118. The planar member 118 is an elongated plate-like member with an upper surface on which the fixed gripper finger mount 104, the fixed gripper finger 106, the cylinder mounts 108, the slide assembly 110, the movable gripper fingers 112, 114, and the work object support bracket 116 are provided. The leg member 120 is a plate-like member having a planar leg surface 124 facing the planar member 118. The leg member 120 may be integrally formed with or joined to the planar member 118 at the longitudinal end 122. The leg member 120 projects in an upward vertical direction from the longitudinal end 122 of the planar member 118 such that the planar member 118 and the leg member 120 define a substantially L-shaped structure.

As described herein, a longitudinal direction (or a longitudinal direction of the planar member 118) references a direction extending from the leg member 120 across a length of the upper surface of the planar member 118 to an opposite longitudinal end of the planar member 118 (i.e., left-and-right in FIGS. 2 and 3), a lateral direction (or a lateral direction of the planar member 118) extends in a direction perpendicular to the longitudinal direction (or the longitudinal direction of the planar member 118) across a width of the upper surface of the planar member 118 (i.e., up-and-down in FIGS. 2 and 3), and a vertical direction extends upward and downward from the upper surface of the planar member 118 (i.e., is perpendicular to both the longitudinal direction and the lateral direction).

Furthermore, the fixed gripper finger mount 104, the fixed gripper finger 106, the cylinder mounts 108, the slide assembly 110, the first and second movable gripper fingers 112, 114, and the work object support bracket 116 are (directly or indirectly) secured to the base 102 via mechanical fasteners. In this regard, the planar member 118 and the leg member 120 may have a plurality of holes defined therethrough which engage mechanical fasteners (not shown) connecting the fixed gripper finger mount 104, the fixed gripper finger 106, the cylinder mounts 108, the slide assembly 110, the first and second movable gripper fingers 112, 114, and the work object support bracket 116 to the base 102. It is to be appreciated that some or all of the aforelisted members of the chuck body 100 may be integrally formed with the base 102, or may be secured thereto via a mechanism other than mechanical fasteners (e.g., adhesive, welding, etc.). In this regard, the base 102 may be formed with mechanisms cooperating with those different mechanisms for securement.

The fixed gripper finger mount 104 includes a first mount leg 126, a second mount leg 128, and a mount connection portion 130. The mount connection portion 130 is provided at a lower end (in the vertical direction) of the first mount leg 126 and projects outwardly therefrom in the lateral direction of the planar member 118. The second mount leg 128 is provided at an upper end (in the vertical direction) of the first mount leg 126, and projects from the first mount leg 126 in the longitudinal direction of the planar member 118 toward the leg member 120 of the base 102. The fixed gripper finger mount 104 may be integrally formed as a unitary piece, or at least one of the second mount leg 128 and the mount connection portion 130 may be joined to the first mount leg 126.

The fixed gripper finger mount 104 is mounted on the planar member 118 by securing or joining the mount connection portion 130 to the planar member 118. The first mount leg 126 projects upwardly in the vertical direction from the planar member 118, such that the second mount leg 128 is spaced from the upper surface of the planar member 118. The second mount leg 128 extends in the longitudinal direction of the planar member 118 from the first mount leg 126 toward the leg member 120 of the base 102, such that a portion of the second mount leg 128 overhangs from (i.e., does not overlay) the first mount leg 126. A fixed gripper finger connection member 132 is provided on an upper surface of the second mount leg 128. The fixed gripper finger connection member 132 is configured to have the fixed gripper finger secured thereto, such that the fixed gripper finger 106 is secured to the fixed gripper finger mount 104 via the fixed gripper finger connection member 132.

The fixed gripper finger 106 is secured to and projects in the upward vertical direction from the fixed gripper finger mount 104. The fixed gripper finger 106 includes a fixed finger member 134 and a fixed attachment member 136. The fixed finger member 134 projects substantially perpendicularly from the fixed attachment member 136 in the vicinity of a first end of the fixed attachment member 136, such that the fixed finger member 134 projects upwardly in the vertical direction when the fixed gripper finger 106 is secured to the fixed gripper finger mount 104. The fixed finger member 134 may be a substantially rod-like member, and may have a substantially cylindrical form. The fixed attachment member 136 may have a substantially rectangular shape when viewed in side-section or plan views. The fixed gripper finger 106 may be integrally formed as a unitary piece, or the fixed finger member 134 and the fixed attachment member 136 may be joined to one another.

The fixed attachment member 136 is formed to be secured to the fixed gripper finger connection member 132 provided on the upper surface of the second mount leg 128. Particularly, the fixed attachment member 136 is secured to the fixed gripper finger connection member 132 and the second mount leg 128 with a second end of the fixed attachment member 136, which is opposite to the first end of the fixed attachment member 136, facing the leg member 120. When secured, the fixed finger member 134 projects upwardly in the vertical direction from the upper surface of the second mount leg 128 from a position in the vicinity of the first end of the fixed attachment member 136, with a portion of the fixed attachment member 136 disposed between the fixed finger member 134 and the leg member 120.

It is to be appreciated that by providing the fixed attachment member 136 as a relatively elongated member, as is shown in FIGS. 1-5, the strength of connection of the fixed gripper finger 106 to the fixed gripper finger mount 104 may be improved. It is also to be appreciated that the fixed gripper finger mount 104 is fixedly secured to the planar member 118 of the base 102, and the fixed gripper finger 106 is fixedly secured to the fixed gripper finger mount 104. Therefore, both the fixed gripper mount 104 and the fixed gripper finger 106 are provided in a fixed position on the planar member 102 of the base 100.

The cylinder mount 108 may be provided as a single-piece assembly which actuates gripping of the work object 101 by the chuck body 100. The cylinder mount 108 may be mounted on the base 102 so as to be secured to both the planar member 118 and the leg member 120. In this regard, the cylinder mount 108 includes a cylinder 138, a linear actuator 140, a casing 142, and cylinder mount connection members 144.

The cylinder 138 may be a rod-like member which projects from the casing 140. The term "cylinder", as used herein and in the claims to reference the cylinder 138, is not intended to indicate that the cylinder 138 has a cylindrical shape. In fact, the cylinder 138 need not have a cylindrical shape. The cylinder 138 may be formed of a material sufficiently strong to exert the necessary forces to actuate gripping and releasing of the work object 101 by the chuck body 100.

The linear actuator 140 operably engages the cylinder 138 to linearly move the cylinder 138 in the longitudinal direction of the planar member 118 toward and away from the fixed gripper finger 106 and the fixed gripper finger mount 104. The linear actuator 140 may take the form of any actuator capable of effecting the necessary linear movement of the cylinder 138 as is required to hold and release the work object 101, as is described in further detail hereinbelow.

The casing 142 houses the linear actuator 140 and at least part of the cylinder 138. In this regard, the casing includes a first surface 146 and a second surface 148 opposite to the first surface 146, with the first and second surfaces 146, 148 defining longitudinal ends of the casing 142. The casing 142 also includes four surfaces connecting the first and second surfaces 146, 148 to form an enclosure in which the linear actuator 140 and at least part of the cylinder 138 are housed. It is to be appreciated that the first surface 146, the second surface 148, and the four surfaces connecting the first and second surfaces 146, 148 may not be planar surfaces, and may not entirely enclose the area in which the linear actuator 140 is housed. Furthermore, the linear actuator 140 and cylinder 138 may be provided without the casing 140.

The casing 142 is secured to the base 102 via a lower surface 150 of the casing 142 (one of the four surfaces connecting the first and second surfaces 146, 148), and the first surface 146 of the casing 142. More particularly, the lower surface 150 of the casing 142 is secured to the upper surface of the planar member 118 via the cylinder mount connection members 144 such that the lower surface 150 of the casing 142 is spaced from the upper surface of the planar member 118. The lower surface 150 of the casing 142 may be substantially parallel with the upper surface of the planar member 118. Additionally, the first surface 146 of the casing 142 is secured to the leg member 120 such that the first surface 146 of the casing 142 may be substantially flush against the planar leg surface 124 of the leg member 120. In this regard, the first surface 146 of the casing 142 may directly abut the planar leg surface 124 of the leg member 120. As an alternative to the illustrated chuck body 100, the lower surface 150 of the casing 142 may directly abut and/or be flush against the upper surface of the planar member 118.

As noted above, the cylinder 138 is at least partially housed within the casing 142, with at least part of the cylinder 138 selectively projecting from the second surface 148 of the casing 142. The linear actuator 140 operably engages the cylinder 138 so as to linearly move the cylinder 138 in the longitudinal direction of the planar member 118 toward and away from the fixed gripper finger 106 and the fixed gripper finger mount 104. In this regard, as the cylinder 138 is linearly moved by the linear actuator 140, an amount of projection of the cylinder 138 from the second surface 148 of the casing 142 changes.

With further respect to the mounting and securement of the cylinder mount 108 to the base 102, the cylinder mount connection members 144 may be used to secure the lower surface 150 of the casing 142 to the planar member 118. The cylinder mount connection members 144 may be both mechanical linkages and conduits for electrically communicating the linear actuator 140 with a controller or computer processing unit. Alternatively, the cylinder mount connection members 144 may be only mechanical linkages or conduits for electrically communicating the linear actuator 140 with the controller or computer processing unit. As conduits, the cylinder mount connection members 144 may either directly communicate the controller or computer processing unit to the linear actuator 140, or may allow wires or other circuitry to pass through the connection members 144 to connect to the linear actuator 140. Accordingly, the linear actuator 140, and therefore the movement of the cylinder 138 and the gripping and releasing of the work object 101 by the chuck body 100, may be controlled by the controller or computer processing unit.

The slide assembly 110 includes a slide 152 and a slide guide 154. The slide 152 includes a connecting member 156, a first slide leg 158, a second slide leg 160, and a lower slide member 162. The slide guide 154 includes a rail 164 and a slider 166.

With reference to the slide 152, the connecting member 156 extends in the lateral direction of the planar member 118 and is secured to a distal end of the cylinder 138. The first slide leg 158 extends in the longitudinal direction toward the fixed gripper finger 106 and the fixed gripper finger mount 104 from a first lateral end of the connecting member 156. The second slide leg 160 extends in the longitudinal direction toward the fixed gripper finger 106 and the fixed gripper finger mount 104 from a second lateral end of the connecting member 156 which is opposite to the first lateral end of the connecting member 156. Accordingly, the second side leg 160 is spaced from the first slide leg 158 in the lateral direction. The lower slide member 162 is provided at a lower surface of the connecting member 156, the first slide leg 158, and the second slide leg 160. The lower slide member 162 may be a planar member having a substantially rectangular shape when viewed from a plan view.

With reference to the slide guide 154, the rail 164 is fixedly secured to the upper surface of the planar member 118. The rail 164 may have a substantially rectangular cross-sectional shape and is generally elongated in the longitudinal direction of the planar member 118. As illustrated, the rail 164 has a pair of longitudinally oriented indents defined in lateral surfaces thereof. The slider 166 includes a pair of legs which moveably engage the rail 164 by each fitting into the pair of longitudinally oriented indents, such that the slider 166 is capable of moving in the longitudinal direction relative to the rail 164, and therefore also relative to the planar member 118. The pair of legs of the slider 166 may include movement facilitating mechanisms, such as ball bearings, etc. It is to be appreciated that the rail 164 and slider 166 may take any form which allows for the slider 166 to move along the rail 164, such as, e.g., a cylindrical rail with an annular slider.

The slider 164 is fixedly secured to the lower slide member 162 of the slide 152, such that the slide 152 and the slider 164 are integrally movable along the rail 156. For example, an upper surface of the slider 164 is illustrated as being fixedly secured to a lower surface of the lower slide member 162. In this regard, the cylinder 138 is secured at the distal end thereof to the connecting member 156. Therefore, linear movement of the cylinder 138 by the actuator 140 causes integral linear movement of the slide 110 and the slider 166 along the rail 164 and relative to the planar member 118. As an alternative to the illustrated slide 152 and slider 164, the slider may be integrated in the slide 152 (e.g., provided by the lower slide member 162). Additionally, the slide guide 154 may be eliminated.

First and second movable gripper finger connection members 168, 170 are respectively provided on upper surfaces of the first slide leg 158 and the second slide leg 160. The first and second movable gripper finger connection members 168, 170 are respectively configured to secure the first and second movable gripper fingers 112, 114 to the first and second slide legs 158, 160.

Generally, the first and second movable gripper fingers 112, 114 are fixedly secured to the slide 110 and positioned to cooperate with the fixed gripper finger 106 to grip the work object 101 when the cylinder 138 and slide 110 are moved toward the fixed gripper finger 106 by the linear actuator 140. In this regard, the first movable gripper finger 112 is secured to and projects in the upward vertical direction from the first slide leg 158, and the second movable gripper finger 114 is secured to and projects from the second slide leg 162. The first movable gripper finger 112, the second movable gripper finger 114, and the fixed gripper finger 106 may be substantially identical. In this regard, the first movable gripper finger 112, the second movable gripper finger 114, and the fixed gripper finger 106 may have identical dimensions, such as height and length dimensions.

The first movable gripper finger 112 includes a first movable finger member 172 and a first movable attachment member 174. The first movable finger member 172 projects substantially perpendicularly from the first movable attachment member 174 in the vicinity of a first end of the first movable attachment member 174, such that the first movable finger member 172 projects upwardly in the vertical direction when the first movable gripper finger 112 is secured to the first slide leg 158. The first movable finger member 172 may be a substantially rod-like member, and may have a substantially cylindrical form. The first movable attachment member 174 may have a substantially rectangular shape when viewed in side-section or plan views. The first movable gripper finger 112 may be integrally formed as a unitary piece, or the first movable finger member 172 may be joined to the first movable attachment member 174.

The first movable attachment member 174 is formed to be secured to the first movable gripper finger connection member 168 provided on the upper surface of the first slide leg 158. Particularly, the first movable attachment member 174 is secured to the first movable gripper finger connection member 168 and the first slide leg 158 with a second end of the first movable attachment member 174, which is opposite to the first end of the first movable attachment member 174, facing the leg member 120. When secured, the first movable finger member 172 projects upwardly in the vertical direction from the upper surface of the first slide leg 158 from a position in the vicinity of the first end of the first movable attachment member 174, with a portion of the first movable attachment member 174 disposed between the first movable finger member 172 and the leg member 120.

It is to be appreciated that by providing the first movable attachment member 174 as a relatively elongated member, as shown in FIGS. 1-5, the strength of connection of the first movable gripper finger 112 to the first slide leg 158 may be improved. It is also to be appreciated that the first movable gripper finger 112 is fixedly secured to the slide 152, and is therefore integrally movable with the slide 152 relative to the base 102.

The second movable gripper finger 114 includes a second movable finger member 176 and a second movable attachment member 178. The second movable finger member 176 projects substantially perpendicularly from the second movable attachment member 178 in the vicinity of a first end of the second movable attachment member 178, such that the second movable finger member 176 projects upwardly in the vertical direction when the second movable gripper finger 114 is secured to the second slide leg 160. The second movable finger member 176 may be a substantially rod-like member, and may have a substantially cylindrical form. The second movable attachment member 178 may have a substantially rectangular shape when viewed in side-section or plan views. The second movable gripper finger 114 may be integrally formed as a unitary piece, or the second movable finger member 176 may be joined to the second movable attachment member 178.

The second movable attachment member 178 is formed to be secured to the second movable gripper finger connection member 170 provided on the upper surface of the second slide leg 160. Particularly, the second movable attachment member 178 is secured to the second movable gripper finger connection member 170 and the second slide leg 160 with a second end of the second movable attachment member 178, which is opposite to the first end of the second movable attachment member 178, facing the leg member 120. When secured, the second movable finger member 176 projects upwardly in the vertical direction from the upper surface of the second slide leg 160 from a position in the vicinity of the first end of the second movable attachment member 178, with a portion of the second movable attachment member 178 disposed between the second movable finger member 176 and the leg member 120.

It is to be appreciated that by providing the second movable attachment member 176 as a relatively elongated member, as shown in FIGS. 1-5, the strength of connection of the second movable gripper finger 114 to the second slide leg 160 may be improved. It is also to be appreciated that the second movable gripper finger 114 is fixedly secured to the slide 152, and is therefore integrally movable with the slide 152 relative to the base 102.

The first and second movable gripper fingers 112, 114 and the slide 110 (including the first and second slide legs 158, 160) may be configured and disposed such that a portion of the second mount leg 128 which projects from the first mount leg 126 toward the leg member 120 is received between the first and second movable finger members 172, 176. Particularly, the portion of the second mount leg 128 which projects from the first mount leg 126 toward the leg member 120 is disposed between the first movable finger member 172 and the second movable finger member 176 in the longitudinal direction of the planar member 118 when the cylinder 138 is linearly moved by a certain amount by the linear actuator 140 toward the fixed gripper finger 106 and the fixed gripper finger mount 104. This configuration allows for added flexibility in a movement range for the fixed gripper finger 106 and the first and second movable gripper fingers 112, 114. Particularly, the fixed gripper finger 106 and the first and second movable gripper fingers 112, 114 may be moved closer to one another.

The work object support bracket 116 includes an upper support arm 180 and a lower support member 182. The upper support arm 172 is secured to an upper portion of the second surface 148 of the casing 142, and includes a pair of arms which are spaced from one another and project upwardly from the cylinder mount 108 when the upper support arm 180 is secured to the casing 142. The pair of arms of the upper support arm 180 is configured to receive and support a portion of the work object 101. In this regard, the exemplary work object 101 described herein includes a linear, rod-like member, and the upper support arm 180 is formed to receive this portion of the work object 101 between the pair of arms. The lower support member 182 is secured to a lower portion of the second surface 148 of the cylinder mount casing 142. The lower support member 182 has a U-shaped opening defined therein, through which the cylinder 138 may pass. An upper end of the lower support member 182 is illustrated as being spaced from a lower end of the upper support arm 180; however, the upper end of the lower support arm 182 may contact and/or be secured to the lower end of the upper support arm 180.

With general reference to the chuck body 100, where any two or more pieces are described as being joined or secured to one another, the joining or securement may be via any known mechanism suitable for the herein-described application. For example, the joining or securement may be via mechanical fasteners, welding, adhesive, etc. The chuck body 100 illustrated in FIGS. 1-5 presents a configuration where members are joined to one another using mechanical fasteners, though the mechanical fasteners are not illustrated. Furthermore, certain pieces of the chuck body 100 which are described above as being joined or secured to one another may alternatively be integrally formed as a unitary piece. Where this is the case, other pieces of the chuck body 100 may be eliminated. For example, if the fixed gripper finger mount 104 and the fixed gripper finger 106 are integrally formed as a unitary piece, the fixed gripper finger connection member 132 and the fixed attachment member 136 may be eliminated.

Further, the chuck body 100 may be formed of any materials suitable for the herein-described application. For example, some or all pieces of the chuck body 100 may be formed of metal, steel, or a high-strength polymer. Different pieces of the chuck body 100 may be formed of different materials.

Now that the structure of the chuck body 100 is described above, description will be made of the use of a chuck body. In this regard, FIG. 2 illustrates the chuck body 100 in an open position, and FIG. 3 illustrates the chuck body 100 in a closed position. When in the open position, the chuck body 100 releases the work object 101 and/or is ready to receive the work object 101. When in the closed position, the chuck body 100 is gripping or holding the work object 101.

In the open position (FIG. 2), the cylinder 138 is retracted into the casing 142 to a maximal degree. Accordingly, the slide 152, the first movable gripper finger 112, and the second movable gripper finger 114 are also pulled to a maximal degree away from the fixed gripper finger 106 and fixed gripper finger mount 104. When in the open position, the work object 101 may be placed such that a portion of the work object 101 is disposed between the first and second movable gripper fingers 112, 114 and the fixed gripper finger 106. Once the work object 101 is so positioned, the linear actuator 140 actuates the cylinder 138 to move in the longitudinal direction away from the leg member 120 and toward the fixed gripper finger 104 and the fixed gripper finger mount 106.

As the cylinder 138 is linearly moved away from the leg member 120 by the linear actuator 140, the slide 152, the first movable gripper finger 112, and the second movable gripper finger 114 are integrally moved with the cylinder 138. Accordingly, the first movable gripper finger 112 and the second movable gripper finger 114 are made to approach the fixed gripper finger 106. Specifically, the slide 152 and slider 166 move along the rail 164 relative to the planar member 118. The closed position of the chuck body (FIG. 3) may be a position at which the cylinder 138 is linearly moved to project from the casing 142 by a maximum possible amount. In the closed position, the portion of the second mount leg 128 which projects from the first mount leg 126 is at least partially received between the first movable gripper finger 112 and the second movable gripper finger 114 in the longitudinal direction of the planar member 118. To accommodate this reception, the space between the first slide leg 158 and the second slide leg 160 is greater than a width of the second mount leg 128 in the lateral direction.

FIG. 4 shows the chuck body 100 in the closed position with the work object 101 held by the fixed gripper finger 106 and the first and second movable gripper fingers 112, 114. In this regard, when the work object 101 is placed between the fixed gripper finger 106 and the first and second movable gripper fingers 112, 114, and the first and second movable gripper fingers 112, 114 are moved in the linear direction toward the fixed gripper finger 106 by the linear actuator 140, the cylinder 138, and the slide assembly 110, the first and second movable gripper fingers 112, 114 press the work object 101 into the fixed gripper finger 106 so as to clamp and grip the work object 101. The clamping/gripping force exerted on the work object 101 may be determined by the force with which the cylinder 138 is linearly moved by the linear actuator 140. In this regard, as the cylinder mount 108 is secured to the leg member 120, additional stability and strength is provided while the linear actuator 140 pushes the cylinder 138 and slide 152 toward the fixed gripper finger 104 and the fixed gripper finger mount 106. The additional stability may provide additional power.

With continuing reference to FIG. 4, the work object 101 is received in and held by the chuck body 100. In this position, a portion of the work object 101 extends from the position of the first movable gripper finger 112, the second movable gripper finger 114, and the fixed gripper finger 106 toward the leg member 120. This portion of the work object 101 has a rod-like shape and is received in and held by the work object support bracket upper support arm 180.

By the above-described configuration, the chuck body 100 is formed of fewer total parts, and operates using fewer moving parts. Consequently, the maintenance, disassembly, and re-assembly of the chuck body 100 may be simplified. Moreover, the frequency with which the chuck body 100 requires maintenance may be reduced.

Figure 6:
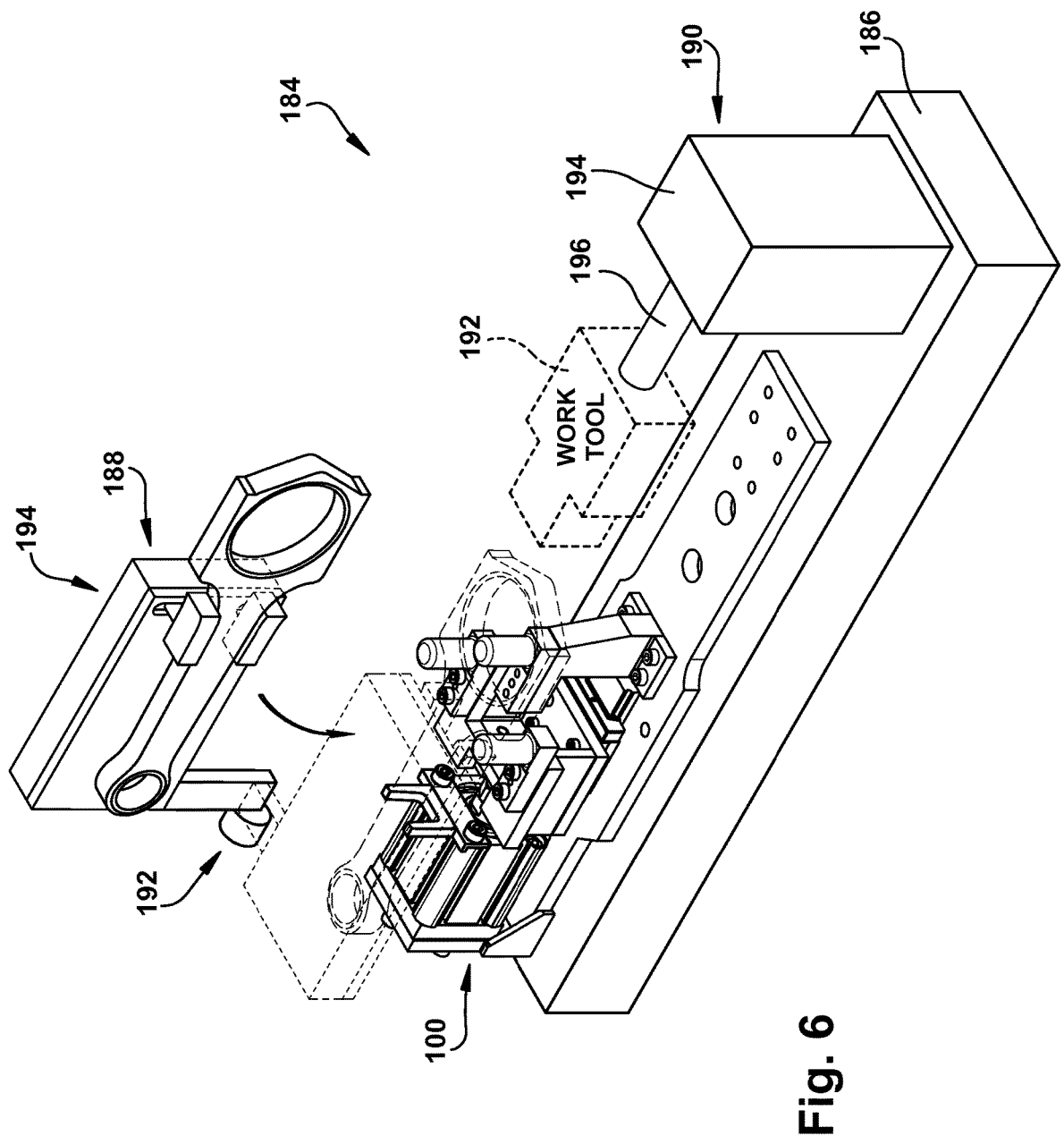
FIG. 6 is a perspective view illustrating a machine center in which the chuck body shown in FIG. 1 is provided.

With reference to FIG. 6, it is noted that the chuck body 100 may be utilized with a machine center 184. The machine center 184 may be any known type of machine center, such as a CNC machine for processing and/or measurement of the work object 101. The machine center 184 shown in FIG. 6 is a generic machine center which may be equipped for any processing application. In this regard, the machine center 184 includes a machine center base 186 on which the chuck body 100 is mounted, a work object transfer mechanism 188, and a processing portion 190.

The chuck body 100 is used to grip the work object 101 transferred to (and from) the base by the work object transfer mechanism 188, while the processing portion 190 processes the work object 101. The chuck body 100 may be mounted on the machine center base 186 via mechanical linkages. Specifically, a lower surface of the planar member 118 of the base 102 may be secured to the machine center base 186. Alternatively, the chuck body 100 may be mounted on the machine center base 186 via any other type of connection mechanism. For example, the base 102 may be integrally formed with the machine center base 186, adhered to the machine center base 186, or welded to the machine center base 186. However, the use of mechanical linkages may simplify a maintenance operation of the chuck body 100 by allowing the chuck body 100, including the base 102, to be removed from the machine center base 186.

The work object transfer mechanism 188 includes a movement mechanism 192 and a gripper 194. The gripper 194 is configured to grip the work object 101, and the movement mechanism 192 is configured to move the gripper 194 and the work object 101 to and from the chuck body 100. The movement mechanism 192 is illustrated as being an arm rotatably mounted to an actuator (which may be provided by the machine center base 186). The gripper 194 is illustrated as being a member with a pair of fingers movable to grip the work object 101. The fingers of the gripper 194 may be biased to close around the work object 101, with the biasing force being sufficiently weak as to release when the gripper 194 is moved away from the chuck body 100 with the work object 101 gripped by the chuck body 100. However, the work object transfer mechanism 188 is merely exemplary, and may take any other form suitable for a given application with the herein-described chuck body 100.

The processing portion 190 includes a work tool 192 and a work tool moving mechanism 194. The work tool 192 may take the form of any processing apparatus used in a machine center. For example, the work tool 192 may measure, grind, weld, polish, etc. The work tool moving mechanism 194 includes an arm 196 movably secured to the machine center base 186 so as to be movable to a position of the work object 101 held by the chuck body 100 to perform the desired processing. The arm 196 is also movable to remove the work tool 192 from the vicinity of the chuck body 100 when the work object 101 is being loaded into the chuck body 100 or removed from the chuck body 100.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

Modification may be made to the herein-described chuck body 100 while remaining within the scope of the instant disclosure. While not considered to be an exhaustive listing of the modifications, a few examples will be given. First, any reference to pieces projecting in a perpendicular direction need not project in the perpendicular direction. Second, while the chuck body 100 is described as having a single fixed gripper finger 106 and a single fixed gripper finger mount 104, more than one fixed gripper finger mount 104 and/or fixed gripper finger 106 may be utilized. Similarly, while the chuck body 100 is described as having two movable gripper fingers 112, 114, the chuck body 100 may utilize fewer or greater than two movable gripper fingers. Third, as noted above, the materials from which the pieces of the chuck body 100 are formed, and the mechanisms used to join or secure different pieces, may be varied as desired based on the application in which the chuck body 100 is used.

Similarly, the precise configuration of certain pieces and/or the positional relationship of certain pieces relative to other pieces may be varied or changed. Specifically, the configurations and positional relationship may be changed to hold a work object having a shape different from that shown in FIG. 4. As an example, any or all of the fixed gripper finger 106, the first movable gripper finger 112, and the second movable gripper finger 114 may be differently configured such that a position of the respective finger members is changed relative to the fixed gripper finger mount 104 and/or the slide 152. As another example, any or all of the fixed gripper finger 106, the first movable gripper finger 112, and the second movable gripper finger 114 may be secured to the respective fixed gripper finger mount 104, first slide leg 158, and second slide leg 160 in a reverse direction, i.e., with the respective second end of the attachment member thereof facing the leg member 120.

It is to be appreciated that the work object 101 is simply provided as an exemplary work object to be gripped or held by the chuck body 100. The chuck body 100 is not limited to gripping the work object 101 illustrated and explicitly described herein.

What is claimed is:

1. A chuck body comprising:
   a base including a planar member, wherein the base further includes a leg member which is secured to and projects from the planar member at a longitudinal end of the planar member;
   at least one fixed gripper finger fixedly secured to the planar member in a permanent location on the planar member at a position spaced a fixed distance from the longitudinal end of the planar member;
   a cylinder mount mounted on the planar member, the cylinder mount including a cylinder and a linear actuator operably engaging the cylinder to linearly move the cylinder in a longitudinal direction of the planar member toward and away from the at least one fixed gripper finger, and wherein the cylinder mount is mounted to the planar member;
   a slide fixedly secured to the distal end of the cylinder and integrally movable with the cylinder so as to be movable relative to the planar member and relative to the at least one fixed gripper finger; and
   at least one movable gripper finger fixedly secured to the slide and thereby movable relative to the planar member and the at least on fixed gripper finger, the at least one movable gripper finger positioned to cooperate with the at least one fixed gripper finger to grip an associated work object when the cylinder and slide are moved toward the at least one fixed gripper finger by the linear actuator,
   wherein a fixed gripper finger mount is fixedly secured to the planar member, the fixed gripper finger mount including a first mount leg and a second mount leg, the first mount leg is fixedly secured at a first end to the planar member, and the second mount leg is provided at a second end of the first mount leg, opposite to the first end of the first mount leg, and projects in the longitudinal direction from the first mount leg toward the cylinder mount, and one fixed gripper finger is secured to and projects from the second mount leg.

2. The chuck body according to claim 1, wherein the cylinder mount includes a casing having a first surface and a second surface opposite to the first surface, the linear actuator is housed in the casing, and the cylinder is movable by the linear actuator to project from the second surface of the casing.

3. The chuck body according to claim 2, wherein the leg member perpendicularly projects from the planar member at said longitudinal end and includes a planar leg surface facing the at least one fixed gripper finger, the first surface of the cylinder mount casing is planar, and the first surface of the cylinder mount casing is secured to and flush against the planar leg surface.

4. The chuck body according to claim 1, wherein the slide includes a connecting member which is secured to the distal end of the cylinder, a first slide leg extending in the longitudinal direction toward the one fixed gripper finger from a first lateral end of the connecting member, a second slide leg extending in the longitudinal direction toward the one gripper finger from a second lateral end of the connecting member, the second slide leg spaced from the first slide leg in a lateral direction, a first movable gripper finger is secured to and projects from the first slide leg and a second movable gripper finger is secured to and projects from the second slide leg.

5. The chuck body according to claim 4, wherein the one fixed gripper finger includes a fixed finger member and a fixed attachment member, the fixed attachment member being secured to the upper surface of the second mount leg, and the fixed finger member projects upwardly from the attachment member in a direction away from the planar member;

the first movable gripper finger includes a first movable finger member and a first movable attachment member, the first movable attachment member being secured to the upper surface of the first slide leg, and the first movable finger member projects upwardly from the first movable attachment member in the direction away from the planar member; and the second movable gripper finger includes a second movable finger member and a second movable attachment member, the second movable attachment member being secured to the upper surface of the second slide leg, and the second movable finger member projects upwardly from the second movable attachment member in the direction away from the planar member.

6. The chuck body according to claim 5, wherein a portion of the second mount leg which projects from the first mount leg is positioned between the first slide leg and the second slide leg in the lateral direction, and said portion of the second mount leg is received between the first and second movable gripper fingers when the cylinder and slide are moved toward the one fixed gripper finger by the linear actuator.

7. The chuck body according to claim 6, further comprising a slide guide including a rail fixedly secured to the planar member and a slider movably engaging the rail so as to be movable in the longitudinal direction of the planar member along the rail, the slider being fixedly secured to the slide such that the slide and slider integrally move along the rail relative to the planar member.

8. The chuck body according to claim 4, wherein a portion of the second mount leg which projects from the first mount leg is positioned between the first slide leg and the second slide leg in the lateral direction, and said portion of the second mount leg is received between the first and second movable gripper fingers when the cylinder and slide are moved toward the one fixed gripper finger by the linear actuator.

9. A chuck body for securing a work object, comprising:

a base including a planar member;

at least one fixed gripper finger fixedly provided on the planar member at a position spaced from a longitudinal end of the planar member, the at least one fixed gripper finger being provided in a fixed position with respect to the planar member and arranged to be receivable within an aperture of the work object;

a cylinder mount mounted on the planar member, the cylinder mount including a cylinder and a linear actuator operably engaging the cylinder to linearly move the cylinder in a longitudinal direction of the planar member toward and away from the at least one fixed gripper finger;

a slide fixedly secured to a distal end of the cylinder and integrally movable with the cylinder;

at least one movable gripper finger secured to the slide and arranged to contact the work object outside the aperture on a portion of the work piece forming the aperture, the at least one movable gripper finger positioned to cooperate with the at least one fixed gripper finger to grip the work object at an end defining the aperture when the cylinder and slide are moved toward the at least one fixed gripper finger by the linear actuator; and a fixed gripper finger mount fixedly secured to the planar member, the fixed gripper finger mount including a first mount leg and a second mount leg, the first mount leg is fixedly secured at a first end to the planar member, and the second mount leg is provided at a second end of the first mount leg, opposite to the first end of the first mount leg, and projects in the longitudinal direction from the first mount leg toward the cylinder mount, and the at least one fixed gripper finger is secured to and projects from the second mount leg.

10. The chuck body according to claim 9, wherein the one fixed gripper finger includes a fixed finger member and a fixed attachment member, the fixed attachment member being secured to the second mount leg, and the fixed finger member projects from the fixed attachment member.

11. The chuck body according to claim 9, wherein the slide includes a connecting member which is secured to the distal end of the cylinder, a first slide leg extending in the longitudinal direction toward the one fixed gripper finger from a first lateral end of the connecting member, a second slide leg extending in the longitudinal direction toward the one fixed gripper finger from a second lateral end of the connecting member, the second slide leg spaced from the first slide leg in a lateral direction, and a first movable gripper finger is secured to and projects from the first slide leg and a second movable gripper finger is secured to and projects from the second slide leg.

12. The chuck body according to claim 11, wherein the one fixed gripper finger includes a fixed finger member and a fixed attachment member, the fixed attachment member being secured to the upper surface of the second mount leg, and the fixed finger member projects upwardly from the attachment member in a direction away from the planar member;

the first movable gripper finger includes a first movable finger member and a first movable attachment member, the first movable attachment member being secured to the upper surface of the first slide leg, and the first movable finger member projects upwardly from the first movable attachment member in the direction away from the planar member; and the second movable gripper finger includes a second movable finger member and a second movable attachment member, the second movable attachment member being secured to the upper surface of the second slide leg, and the second movable finger member projects upwardly from the second movable attachment member in the direction away from the planar member.

13. The chuck body according to claim 12, wherein a portion of the second mount leg which projects from the first mount leg is positioned between the first slide leg and the second slide leg in the lateral direction, and said portion of the second mount leg is received between the first and second movable gripper fingers when the cylinder and slide are moved toward the one fixed gripper finger by the linear actuator.

14. The chuck body according to claim 11, wherein a portion of the second mount leg which projects from the first mount leg is positioned between the first slide leg and the second slide leg in the lateral direction, and said portion of the second mount leg is received between the first and second movable gripper fingers when the cylinder and slide are moved toward the one fixed gripper finger by the linear actuator.

15. A chuck body comprising:
a base including a planar member;
at least one fixed gripper finger fixedly provided on the planar member at a position spaced from a longitudinal end of the planar member, the at least one gripper finger having a cylindrical configuration with an axis orthogonally oriented relative to the planar member;
a cylinder mount mounted on the planar member, the cylinder mount including a cylinder and a linear actuator operably engaging the cylinder to linearly move the cylinder in a longitudinal direction of the planar member toward and away from the at least one fixed gripper finger;
a rail fixedly secured to the planar member;
a slide fixedly secured to a distal end of the cylinder and integrally movable with the cylinder on the rail; and
at least one movable gripper finger secured to the slide, the at least one movable gripper finger having a cylindrical configuration with an axis orthogonally oriented relative to the planar member and positioned to cooperate with the at least one fixed gripper finger to grip an associated work object when the cylinder and slide are moved toward the at least one fixed gripper finger by the linear actuator,
wherein the slide includes a connecting member extending in a lateral direction of the planar member which is fixedly secured to the distal end of the cylinder, a first slide leg extending outwardly in the longitudinal direction toward the at least one fixed gripper finger from a first lateral end of the connecting member, a second slide leg extending outwardly in the longitudinal direction toward the at least one fixed gripper finger from a second lateral end of the connecting member, the second slide leg spaced from the first slide leg in the lateral direction, and
wherein the at least one movable gripper finger includes a first movable gripper finger and a second movable gripper finger, wherein the first movable gripper finger is secured to and projects from the first slide leg and the second movable gripper finger is secured to and projects from the second slide leg.

16. The chuck body according to claim 15, further comprising a slide guide including the rail fixedly secured to the planar member and a slider movably engaging the rail so as to be movable in the longitudinal direction of the planar member along the rail, the slider being fixedly secured to the slide such that the slide and slider integrally move along the rail relative to the planar member.

* * * * *